(12) United States Patent
Schaefer

(10) Patent No.: US 11,465,581 B2
(45) Date of Patent: Oct. 11, 2022

(54) APPARATUS FOR GUIDING INFLATION FLUID WITHIN AN AIRBAG

(71) Applicant: ZF Passive Safety Systems US Inc., Washington, MI (US)

(72) Inventor: Manuel Schaefer, Berlin, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 235 days.

(21) Appl. No.: 16/684,779

(22) Filed: Nov. 15, 2019

(65) Prior Publication Data

US 2021/0146876 A1 May 20, 2021

(51) Int. Cl.
*B60R 21/2346* (2011.01)
*B60R 21/232* (2011.01)

(52) U.S. Cl.
CPC ........ *B60R 21/2346* (2013.01); *B60R 21/232* (2013.01)

(58) Field of Classification Search
CPC .............. B60R 21/2346; B60R 21/232; B60R 21/2334
See application file for complete search history.

(56) References Cited

U.S. PATENT DOCUMENTS

| | | | | |
|---|---|---|---|---|
| 5,172,933 A * | 12/1992 | Strasser | ............. | B60R 21/2346 280/743.1 |
| 5,494,314 A * | 2/1996 | Kriska | ................ | B60R 21/2346 280/740 |
| 5,516,146 A * | 5/1996 | Kopitzke | ............ | B60R 21/2171 280/728.2 |
| 5,913,535 A * | 6/1999 | Taguchi | .............. | B60R 21/2346 280/743.1 |
| 6,199,898 B1 * | 3/2001 | Masuda | ................ | B60R 21/232 280/729 |
| 6,530,595 B2 * | 3/2003 | Masuda | ................ | B60R 21/232 280/729 |
| 6,945,556 B2 * | 9/2005 | Maertens | .............. | B60R 21/232 280/729 |
| 9,566,933 B2 * | 2/2017 | Jinnai | ................. | B60R 21/2171 |
| 2010/0276917 A1 * | 11/2010 | Chavez | .............. | B60R 21/2346 280/740 |
| 2017/0001594 A1 * | 1/2017 | Hatakeyama | ......... | B60R 21/231 |

* cited by examiner

*Primary Examiner* — Frank B Vanaman
(74) *Attorney, Agent, or Firm* — Tarolli, Sundheim, Covell & Tummino LLP

(57) ABSTRACT

An apparatus for helping to protect an occupant of a vehicle includes an airbag and a fabric diffuser for directing inflation fluid from an inflator into the airbag. The fabric diffuser comprises first and second fabric panels arranged overlying each other and having portions interconnected along seams to define a pocket configured to receive the inflator. The pocket has a double layer diffuser section defined by the overlying first and second fabric panels that is configured to receive a discharge end of the inflator. The fabric diffuser is configured to be installed in the airbag. The first and second panels are configured so that a plurality of openings of the first fabric panel do not overlie a plurality of openings of the second fabric panel when the panels are interconnected so that inflation fluid travels an indirect path from inside the diffuser section to the exterior of the fabric diffuser.

27 Claims, 7 Drawing Sheets

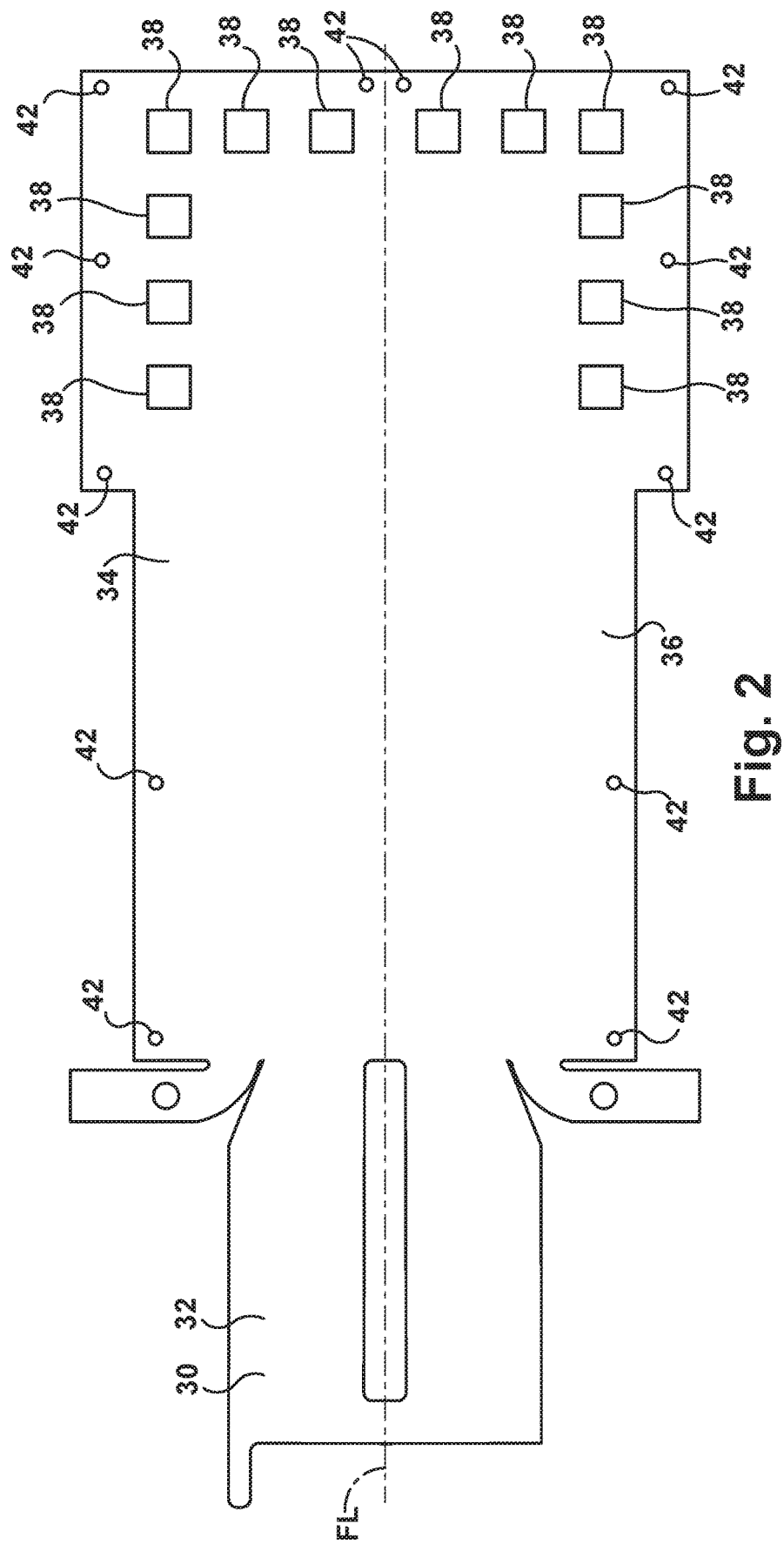

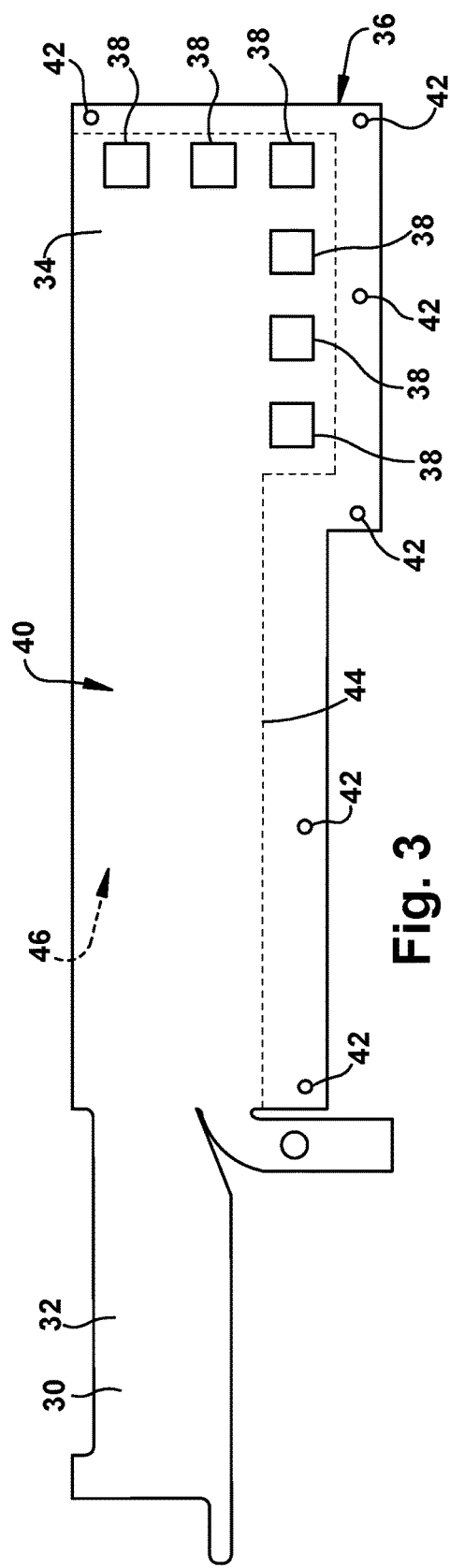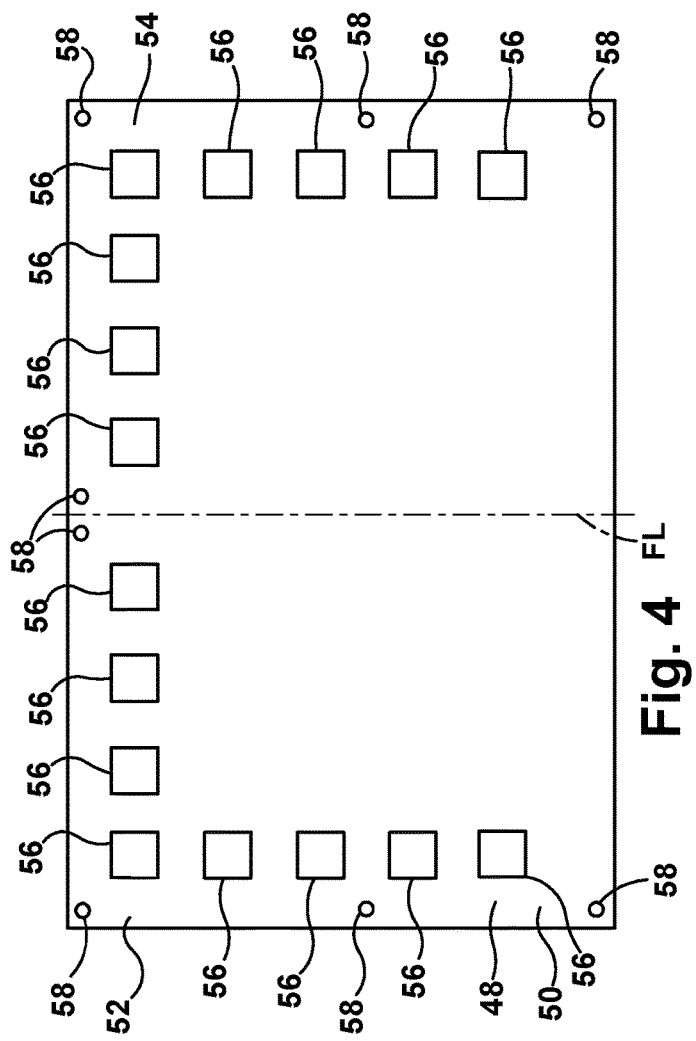

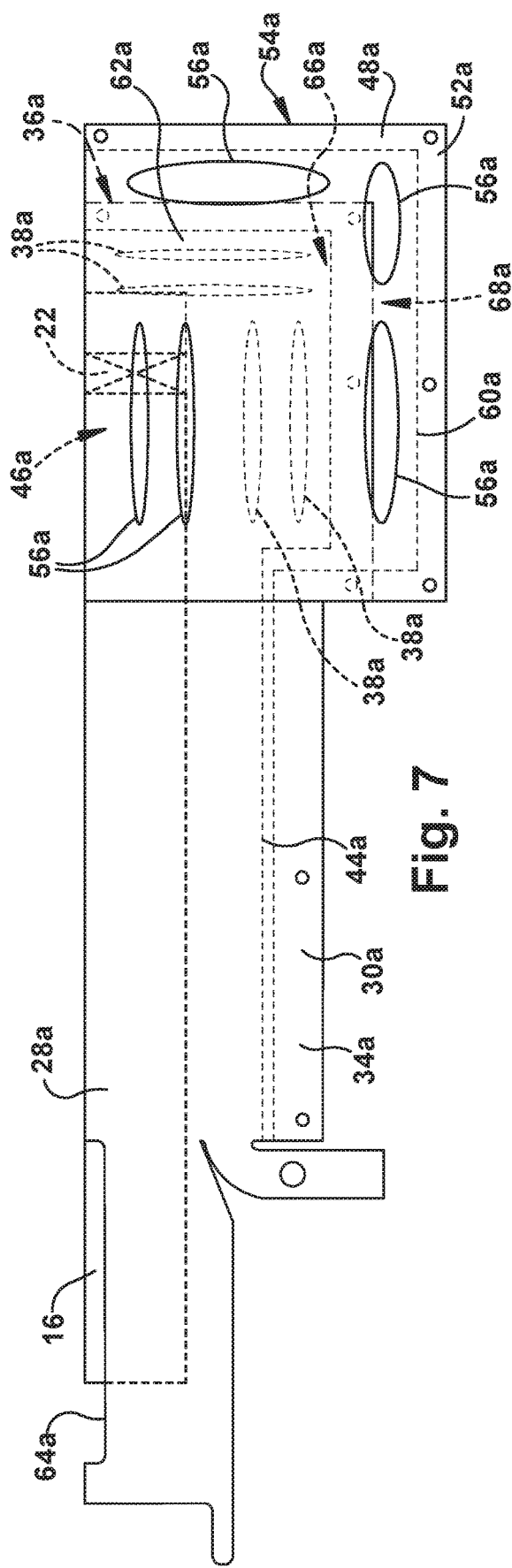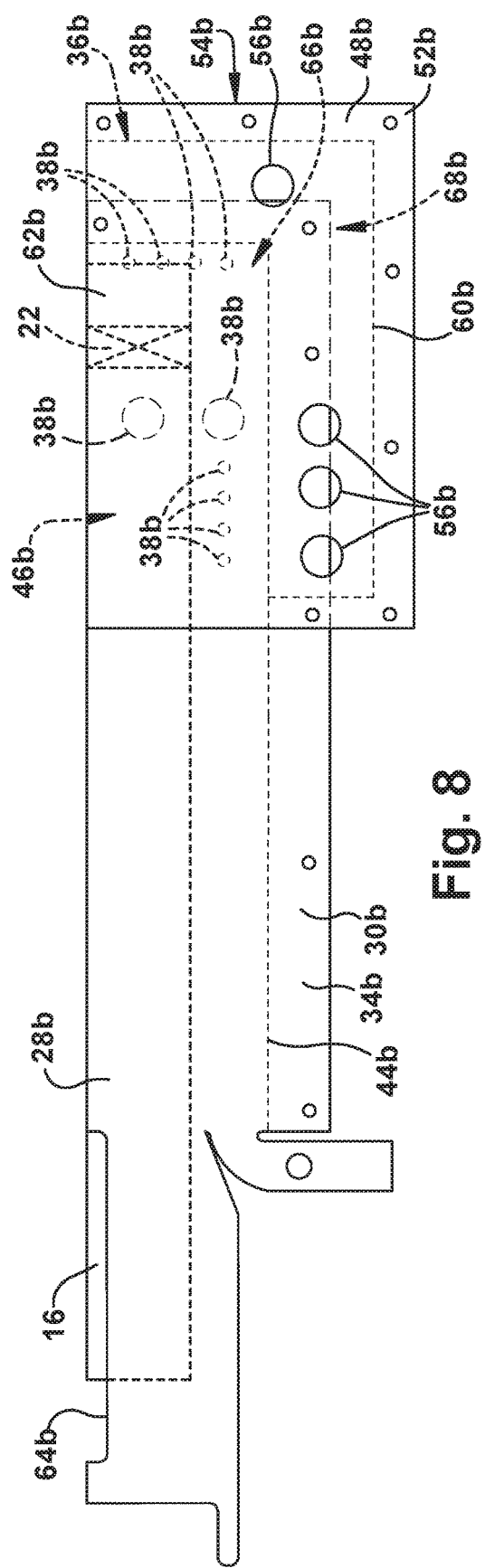

APPARATUS FOR GUIDING INFLATION FLUID WITHIN AN AIRBAG

FIELD OF THE INVENTION

The invention relates to an apparatus for helping to protect an occupant of a vehicle. More particularly, the invention relates to curtain airbag having a fabric diffuser for directing inflation fluid from an inflator into the curtain airbag.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that is fixed to the roof of the vehicle and/or to a support structure adjacent to the roof of the vehicle. The inflatable curtain is configured to inflate from the roof of the vehicle downward inside the passenger compartment in the event of a side impact or a vehicle rollover. The inflatable curtain, when inflated, is positioned between a vehicle occupant and the side structure of the vehicle.

Inflatable curtains often include an opening in which an inflator for inflating the inflatable curtain is installed. The hot gas generated by the inflator is often directed through gas guides into the inflatable curtain. These gas guides can also serve to protect the inflatable curtain fabric from the hot gases.

SUMMARY OF THE INVENTION

According to one aspect, an apparatus for helping to protect an occupant of a vehicle includes an airbag and a fabric diffuser for directing inflation fluid from an inflator into the airbag. The fabric diffuser comprises first and second fabric panels arranged overlying each other and having portions interconnected along seams to define a pocket configured to receive the inflator. The pocket has a double layer diffuser section defined by the overlying first and second fabric panels that is configured to receive a discharge end of the inflator. The fabric diffuser is configured to be installed in the airbag. The diffuser section comprises a plurality of openings formed in and/or defined by the first and second fabric panels. The openings provide fluid communication from inside the diffuser section to the exterior of the fabric diffuser. The first and second panels are configured so that the openings of the first fabric panel do not overlie the openings of the second fabric panel when the panels are interconnected so that inflation fluid travels an indirect path from inside the diffuser section to the exterior of the fabric diffuser.

According to another aspect, alone or in combination with any other aspect, the inflation fluid travelling the indirect path can travel from inside the diffuser section through the openings of the first panel, between the first and second panels, and then through the openings of the second panel to the exterior of the fabric diffuser.

According to another aspect, alone or in combination with any other aspect, the inflation fluid travelling the indirect path can travel from inside the diffuser section through the openings of the first panel, be redirected by the second panel, and then travel through the openings of the second panel to the exterior of the fabric diffuser.

According to another aspect, alone or in combination with any other aspect, the first panel can comprise a fabric sheet having overlying layers that can be interconnected along seams to define a single layer portion of the pocket configured to receive the inflator.

According to another aspect, alone or in combination with any other aspect, a portion of the seams can form a barrier in the diffuser section between the overlying layers of the first panel for directing inflation fluid toward the openings of the first panel.

According to another aspect, alone or in combination with any other aspect, the second panel can comprise a fabric sheet separate from the first panel. The second panel can be wrapped about and connected to the folded and interconnected first panel to define the diffuser section.

According to another aspect, alone or in combination with any other aspect, a space through which inflation fluid is configured to travel can be defined between the first and second panels.

According to another aspect, alone or in combination with any other aspect, the diffuser section can comprise a plurality of openings formed in the first and second fabric panels.

According to another aspect, alone or in combination with any other aspect, the diffuser section can comprise a plurality of openings formed in the first fabric panel and a plurality of openings defined by the second fabric panel. The plurality of openings of the second panel can be defined by overlying layers of the second panel and by a portion of the seams so that the plurality of openings of the second panel extend between the overlying layers of the second panel.

According to another aspect, alone or in combination with any other aspect, the openings of the first and second panels can define a plurality of fluid paths extending from inside the diffuser section to the exterior of the fabric diffuser. At least one of the fluid paths can be configured to direct inflation fluid into the airbag in a different direction than at least one other of the fluid paths.

According to another aspect, alone or in combination with any other aspect, at least one of the plurality of openings can be configured to permit a greater flow rate of inflation fluid therethrough than at least one other of the plurality of openings.

According to another aspect, alone or in combination with any other aspect, the diffuser section can comprise a plurality of openings formed in first and second fabric panels.

According to another aspect, alone or in combination with any other aspect, the airbag can be a curtain airbag and the fabric diffuser can be configured to be installed in a mouth opening of the curtain airbag.

According to another aspect, alone or in combination with any other aspect, a method for constructing the apparatus can comprise inserting an inflator into the pocket of the fabric diffuser. The inflator can be arranged in the pocket so that the discharge end of the inflator is received in the diffuser section. The combined fabric diffuser and inflator can be inserted into the airbag.

According to another aspect, alone or in combination with any other aspect, the airbag can be a curtain airbag. Inserting the combined fabric diffuser and inflator into the airbag can comprise inserting the combined fabric diffuser and inflator into a mouth opening of the curtain airbag.

According to another aspect, alone or in combination with any other aspect, an airbag module can comprise the apparatus. The airbag module can further comprise an inflator for inflating the airbag. The inflator can be received in the pocket of the fabric diffuser.

According to another aspect, alone or in combination with any other aspect, a vehicle safety system can comprise the airbag module. The vehicle safety system can further comprise an airbag controller operatively connected to the inflator and configured to actuate the inflator in response to sensing the occurrence of an event for which occupant protection is desired.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIG. 2 illustrates a first step of a method for assembling an element of the apparatus of FIG. 1;

FIG. 3 illustrates a second step of the method for assembling an element of the apparatus of FIG. 1;

FIG. 4 illustrates a third step of the method for assembling an element of the apparatus of FIG. 1:

FIG. 7 is a schematic side view of an element of the apparatus of FIG. 1 in a second configuration;

FIG. 8 is a schematic side view of an element of the apparatus of FIG. 1 in a third configuration;

DETAILED DESCRIPTION OF THE INVENTION

Figure 1:
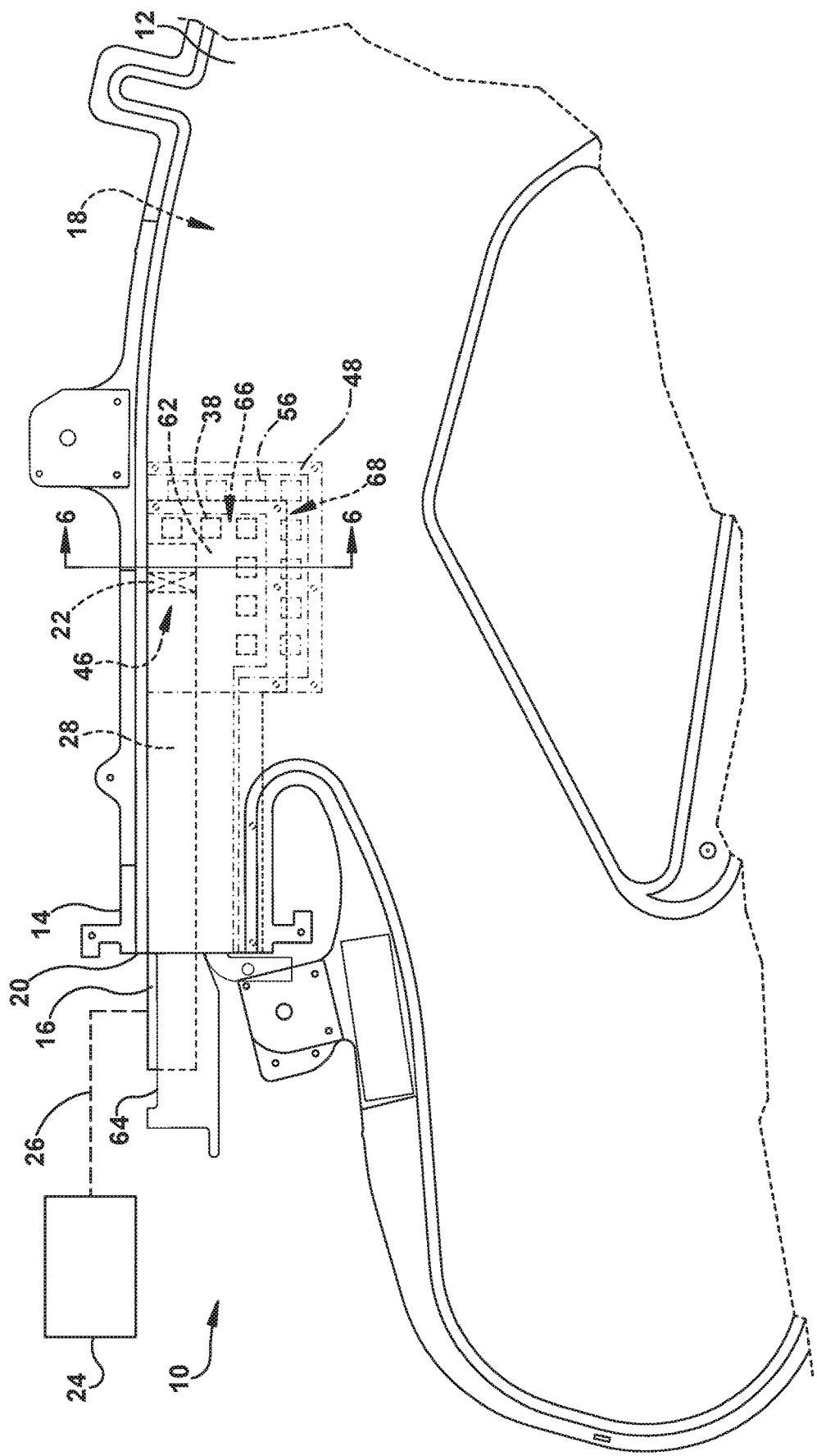
FIG. 1 is a schematic side view illustrating an apparatus for helping to protect an occupant of a vehicle, including a first configuration for an element of the apparatus.

As shown in FIG. 1, an apparatus 10 for helping to protect an occupant of a vehicle includes an inflatable vehicle occupant protection device 12 in the form of an airbag, such as a curtain airbag, for helping to protect the vehicle occupant. The curtain airbag 12 can be constructed of any suitable material, such as nylon (e.g., woven nylon 6-6 yarns), and can be constructed in any suitable manner. For example, the curtain airbag 12 may have a one-piece woven (OPW) construction in which the curtain airbag is woven as a single piece of material. As another example, the curtain airbag 12 can include more than one piece of material. If more than one piece is used, the pieces can be interconnected by known means, such as stitching, ultrasonic welding, heat bonding, or adhesives, to form the curtain airbag 12. The curtain airbag 12 can be uncoated, coated with a material, such as a gas impermeable urethane, or laminated with a material, such as a gas impermeable film. The curtain airbag 12 can thus have a gas-tight or substantially gas-tight construction. Those skilled in the art will appreciate that alternative materials, such as polyester yarn, and alternatives coatings, such as silicone, can also be used to construct the curtain airbag 12.

The curtain airbag 12 can be a part of an airbag module 14 that also includes an inflator 16 operably connected to an inflatable volume 18 of the curtain airbag. In the example configuration of FIG. 1, the inflator 16 is inserted in a mouth opening 20 of the curtain airbag 12 so that a discharge end 22 of the inflator is provided in the inflatable volume 18 of the curtain airbag. The inflator 16 is actuatable to provide inflation fluid to the inflatable volume 18 of the curtain airbag 12 to inflate and deploy the curtain airbag from a stored condition to a deployed condition. The inflator 16 can be of any known type, such as stored gas, solid propellant, augmented, or hybrid. An airbag controller 24 can be operatively connected to the inflator 16 via lead wires 26. The airbag controller 24 is configured to actuate the inflator 16 in response to sensing the occurrence of an event for which occupant protection is desired, such as a collision.

The curtain airbag 12 and the inflator 16 of the airbag module 14 are configured to be mounted to a support structure of the vehicle as a unit. The support structure can be any structure in the vehicle that will accommodate the curtain airbag 12 being deployed therefrom so that the deployed curtain airbag is positioned between a vehicle occupant and a side structure of the vehicle, such as a vehicle door, a side window, a roof rail, and/or a vehicle pillar. The curtain airbag 12 can be mounted to the support structure in any desired manner.

The airbag module 14 further includes a fabric diffuser 28 for directing inflation fluid from the inflator 16 into the inflatable volume 18 of the curtain airbag 12. As shown in the example configuration of FIG. 1, the fabric diffuser 28 is configured to be installed in the mouth opening 20 of the curtain airbag 12. FIGS. 2-5 illustrate an example process by which the fabric diffuser 28 can be assembled and arranged with the inflator 16. As shown in FIG. 2, a first fabric panel 30 comprising a fabric sheet 32 is provided. The first fabric panel 30 comprises first and second portions 34, 36. At least one of the first and second portions 34, 36 can have one or more openings 38 formed therein. In the example configuration of FIG. 2, the first portion 34 of the first fabric panel 30 has a plurality of openings 38 extending therethrough that mirror a plurality of openings 38 that extend through the second portion 36 of the first fabric panel. Each of the openings 38 is shown in the example configuration of FIG. 2 as having a square configuration.

As shown in FIGS. 2-3, the first portion 34 of the first fabric panel 30 is folded over about a fold-line FL onto the second portion 36 to define overlying layers 40. Once folded over, the first portion 34 can be aligned with the second portion 36 so that the plurality of openings 38 on the first portion are aligned with the plurality of openings 38 on the second portion. The first fabric panel 30 can include one or more alignment openings 42 that assist a worker in aligning the first and second portions 34, 36 of the folded first fabric panel. The overlying first and second portions 34, 36 are then interconnected, such as by being stitched together, along a seam 44 to define a pocket 46 in the first fabric panel 30 that is configured to receive the inflator 16.

As shown in FIG. 4, a second fabric panel 48 comprising a fabric sheet 50 separate from the first fabric panel 30 is provided. The second fabric panel 48 comprises first and second portions 52, 54. At least one of the first and second portions 52, 54 can have one or more openings 56 formed therein. In the example configuration of FIG. 4, the first portion 52 of the second fabric panel 48 has a plurality of openings 56 extending therethrough that mirror a plurality of openings 56 that extend through the second portion 54 of the second fabric panel. Each of the openings 56 is shown in the example configuration of FIG. 4 as having a square configuration.

Figure 5:
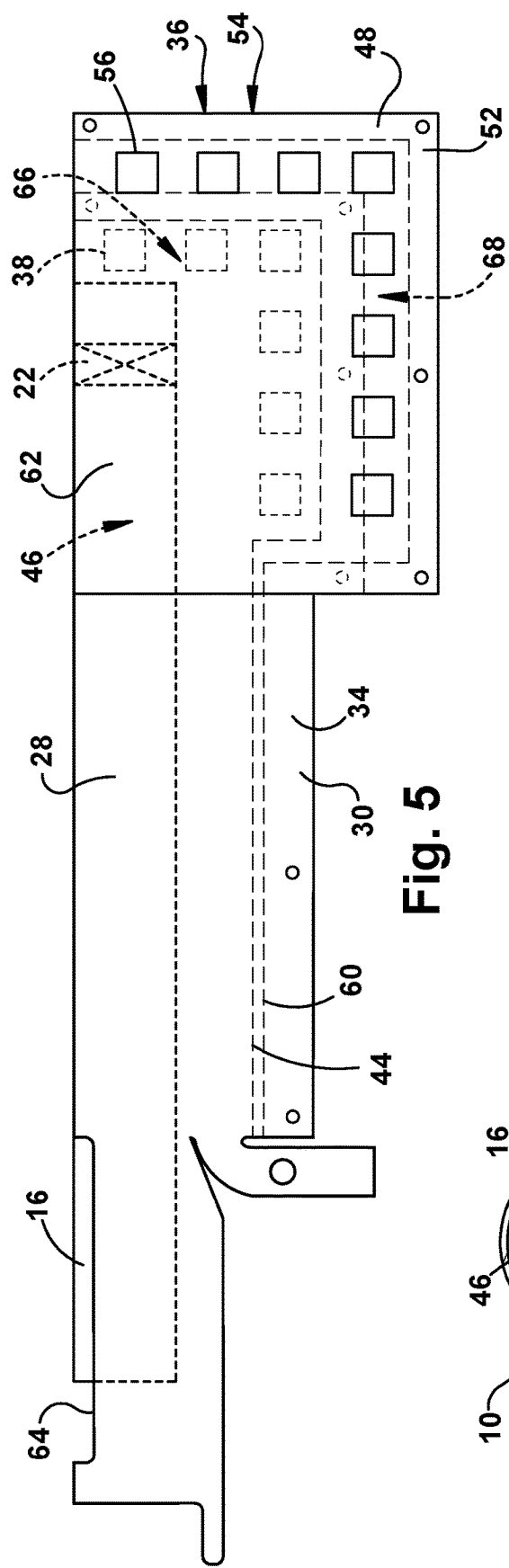
FIG. 5 illustrates a fourth step of the method for assembling an element of the apparatus of FIG. 1.

As shown in FIGS. 4-5, the second fabric panel 48 is wrapped about the folded and interconnected first fabric panel 30. For example, the first portion 52 of the second fabric panel 48 is positioned overlying the first portion 34 of the first fabric panel 30 and then the second portion 52 of the second fabric panel is folded about a fold line FL and positioned overlying the second portion 36 of the first fabric panel. Once the second fabric panel 48 is wrapped about the first fabric panel 30, the first portion 52 of the second fabric panel can be aligned with the second portion 54 of the second fabric panel so that the plurality of openings 56 on the first portion of the second fabric panel are aligned with the plurality of openings 56 on the second portion of the second fabric panel. Further, the second fabric panel 48 is aligned with the first fabric panel 30 so that the openings 56 in the second fabric panel do not overlie the openings 38 of the first fabric panel. As shown in FIG. 4, the second fabric panel 48 can include one or more alignment openings 58 that assist a worker in aligning the first and second portions 52, 54 of the second fabric panel relative to each other and relative to the first fabric panel 30.

Figure 6:
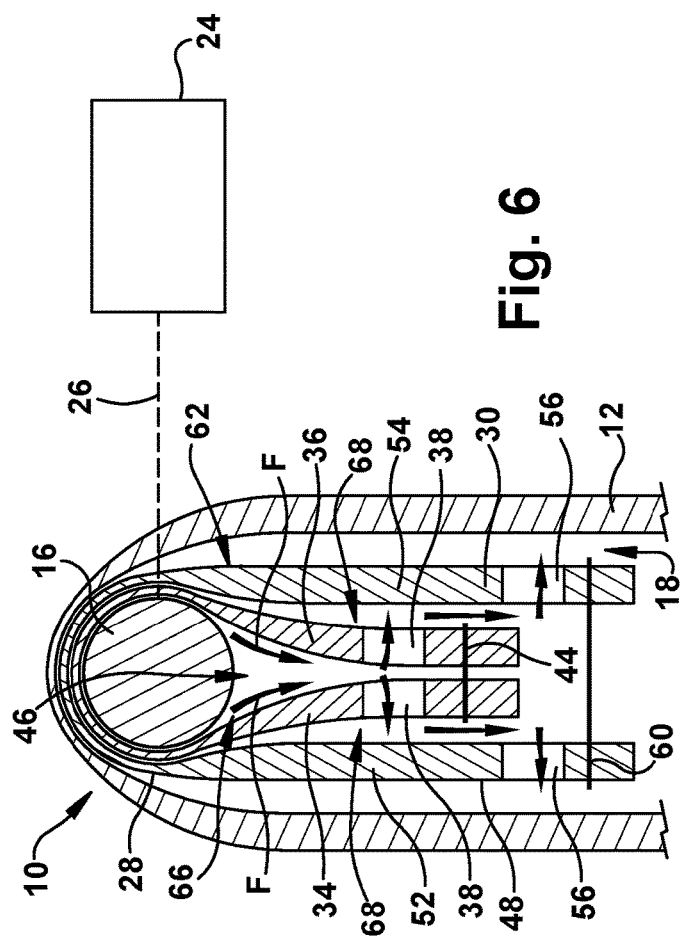
FIG. 6 is a sectional view taken along line 6-6 in FIG. 1, including a portion of the apparatus of FIG. 1 in an example use condition.

As shown in FIG. 5, the aligned first and second portions 52, 54 of the second fabric panel 48 are then interconnected, such as by stitching, to each other and to the first fabric panel 30 along a seam 60. As shown in FIGS. 5-6, the first and second fabric panels 30, 48 overlying each other define a double layer diffuser section 62 of the pocket 46. The diffuser section 62 includes the plurality of openings 38, 56 formed in the first and second fabric panels 30, 48.

Once the first and second fabric panels 30, 48 are interconnected, the inflator 16 can be inserted into the pocket 46 through an inflator receiving opening 64 in the first fabric panel. The inserted inflator 16 is arranged within the pocket 46 so that the discharge end 22 is received in the diffuser section 62. The discharge end 22 of the inflator 16 is thus inserted into a first layer 66 of the diffuser section 62, i.e., into a first space of the double layered diffuser section that is defined by the first fabric panel 30.

As shown in FIG. 1, the combined fabric diffuser 28 and inflator 16 are then inserted into the mouth opening 20 of the curtain airbag 12. The openings 38, 56 formed in the first and second fabric panels 30, 48 provide fluid communication from inside the diffuser section 62 to the exterior of the fabric diffuser 28 in the inflatable volume 18 of the curtain airbag 12. The openings 38, 56 in the first and second fabric panels 30, 48 also define a plurality of fluid paths extending from inside the diffuser section 62 to the exterior of the fabric diffuser 28. The openings 38, 56 can be positioned in the first and second fabric panels 30, 48 so that at least one of the fluid paths defined by the openings is configured to direct inflation fluid into the inflatable volume 18 in a different direction than at least one other of the fluid paths.

As shown in FIG. 6, upon the occurrence of an event for which occupant protection is desired, such as a collision, the airbag controller 24 actuates the inflator 16 to provide inflation fluid (indicated at arrows F) into the first layer 66 of the diffuser section 62. The inflation fluid F then travels through the plurality of openings 38 in the first fabric panel 30 into a second layer 68 of the diffuser section 62. The second layer 68 of the diffuser section 62 is a second space of the double layered diffuser section that is defined between the first and second fabric panels 30, 48. Because the plurality of openings 56 in the second fabric panel 48 are not aligned with the plurality of openings 38 of the first fabric panel 30, the inflation fluid F travels an indirect path from the first layer 66 of the diffuser section 62 to the exterior of the fabric diffuser 28.

By "indirect" path, it is meant that the non-aligned openings 38, 56 in the first and second fabric panels 30, 48 forces the inflation fluid to follow a tortuous path through the diffuser section 62. As the inflation fluid exits the inflator 16, regardless of where and in what direction, it is redirected by the fabric of the first and/or second fabric panels 30, 48 prior to passing through the openings 38, 56. Because the first and second fabric panels 30, 48 are aligned, specifically, so that each of the openings 38, 56 overlies or is covered by fabric from the adjacent first or second fabric panel 30, 48, there is no instance where inflation fluid can be discharged directly, i.e., linearly and without obstruction, into the curtain airbag 12.

For example, inflation fluid F traveling through the plurality of openings 38 in the first fabric panel 30 into the second layer 68 of the diffuser section 62 is redirected by the second fabric panel 48 toward the plurality of openings 56 in the second fabric panel. The inflation fluid F then travels through the second layer 68 of the diffuser section 62 and out to the exterior of the fabric diffuser 28 through the plurality of openings 56 in the second fabric panel 48. Thus, as described above and shown in the example configuration of FIG. 6, inflation fluid F provided by the inflator 16 travels an indirect path from inside the diffuser section 62 to the exterior of the fabric diffuser 28.

The inflation fluid expelled by the inflator 16 can be hot and can carry hot particulate matter produced by the inflator. If allowed to flow directly to the airbag fabric of the curtain airbag 12, the hot inflation fluid and particulate matter could damage the curtain airbag 12. The diffuser section 62, by providing an indirect path for the inflation fluid to travel, helps to limit and/or prevent the hot inflation fluid and particulate matter from flowing directly to the curtain airbag fabric. The hot inflation gas, by indirectly traveling through the diffuser section 62, has time to cool before coming into contact with the curtain airbag fabric. Further, the indirect path provided by the diffuser section 62 acts as a filter that helps prevent any hot particulate matter produced by the inflator 16 from reaching the curtain airbag fabric. For example, hot particulate matter being carried by the inflation fluid through the diffuser section 62 can fall out of the inflation fluid stream and be held in the first and/or second layers 66, 68 of the diffuser section, and/or can be captured by the second fabric panel 48 when the inflation fluid is redirected in the second layer by the second fabric panel.

The particular configuration of the fabric diffuser 28 and the first and second fabric panels 30, 48 of the fabric diffuser are secondary to the fabric diffuser's provision of an indirect path for inflation fluid to travel. Thus, the fabric diffuser 28 shown in FIGS. 1-5 illustrates just one example configuration of the fabric diffuser. For example, instead of being formed from separate fabric sheets 32, 50, the first and second fabric panels 30, 48 can be two portions of a single fabric sheet that are folded onto each other, or otherwise manipulated, to form the fabric diffuser 28 shown in FIG. 5.

FIGS. 7-12 depict other example configurations of the fabric diffuser 28, 28a, 28b, 28c, 28d. The example configurations of the fabric diffuser 28, 28a, 28b, 28c, 28d are not necessarily exclusive of each other. Those skilled in the art will appreciate that certain features can be shared and/or combined between the example configurations whether expressly stated, shown, or not. Structures of the example configurations depicted in FIGS. 7-12 that are the same as or similar to those described with reference to FIGS. 1-5 are either unnumbered or have the same reference numbers with the addition of an associated alphabetical mark. Description of common elements and operation similar to those in the previously described configuration may not be repeated with respect to the configurations of FIGS. 7-12, for brevity.

The example configuration of the fabric diffuser 28a shown in FIG. 7 is substantially similar to the fabric diffuser 28 of FIGS. 1-5, except that the plurality of openings 38a, 56a formed in the first and second fabric panels 30a, 48a of the fabric diffuser 28a of FIG. 7 have an elliptical configuration instead of a square configuration. Further, as shown in the example configuration of FIG. 7, at least one of the plurality of openings 38a, 56a in the first and/or second fabric panels 30a, 48a can be configured to be larger than at least one other of the plurality of openings in the first and/or second fabric panels. Because of their size, openings 38a, 56a that are larger than other, smaller openings are configured to permit a greater flow rate of inflation fluid therethrough then the smaller openings. By varying the size and location of the plurality of openings 38a, 56a in the first and/or second fabric panels 30a, 48a, the fabric diffuser 28a can be designed to direct a greater rate of inflation fluid to particular portions of the curtain airbag 12 in order to inflate those particular portions ahead of other portions of the curtain airbag.

The example configuration of the fabric diffuser 28b shown in FIG. 8 is substantially similar to the fabric diffusers 28, 28a shown in FIGS. 1-5 and FIG. 7, except that the plurality of openings 38b, 56b formed in the first and second fabric panels 30b, 48b have a circular configuration instead of a square or an elliptical configuration. Further, similar to the fabric diffuser 28a of FIG. 7, at least one of the plurality of openings 38b, 56b in the first and/or second fabric panels 30b, 48b of the fabric diffuser 28b of FIG. 8 can be configured to be larger than at least one other of the plurality of openings in the first and/or second fabric panels.

Figure 9:
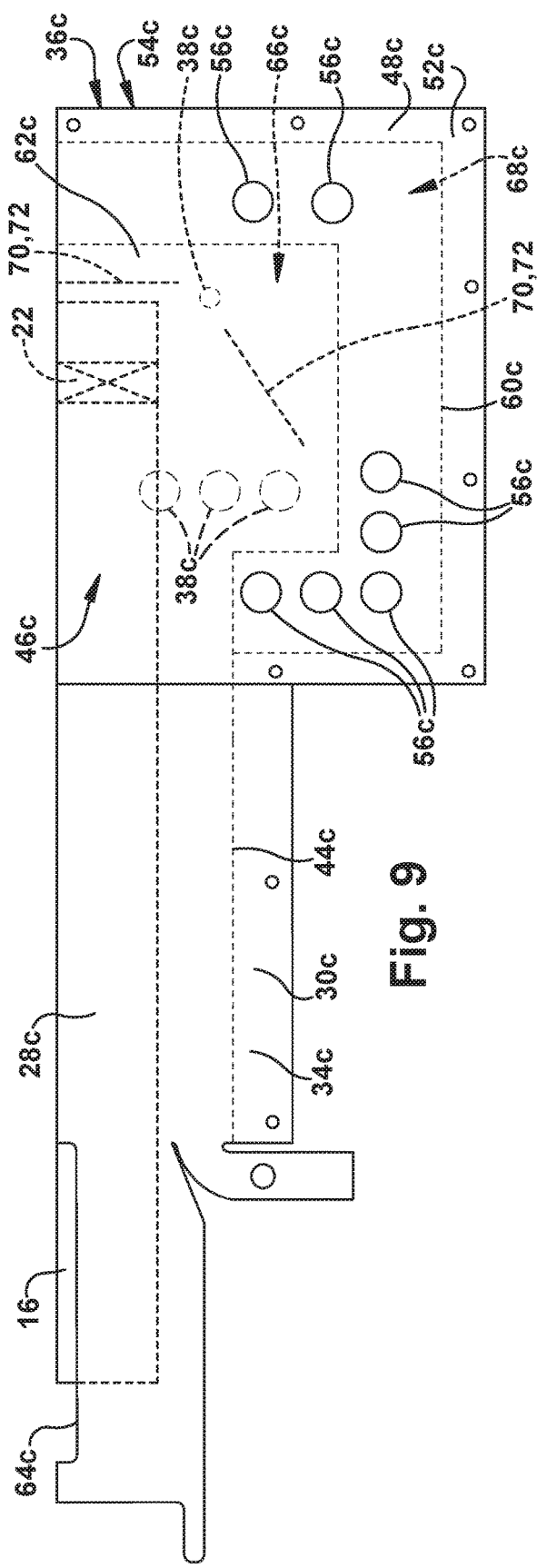
FIG. 9 is a schematic side view of an element of the apparatus of FIG. 1 in a fourth configuration.

The example configuration of the fabric diffuser 28c shown in FIG. 9 is substantially similar to the fabric diffuser 28b shown in FIG. 8, except that the first and second portions 34c, 36c of the first fabric panel 30c are also interconnected along one or more secondary seams 70. The one or more secondary seams 70 extend through the first layer 66c of the diffuser section 62c and form one or more barriers 72 in the diffuser section between the overlying first and second portions 34c, 36c of the first fabric panel 30c. In the example configuration of FIGS. 9-10, the first and second portions 34c, 36c of the first fabric panel 30c are interconnected along two secondary seams 70 that form two barriers 72 in the first layer 66c of the diffuser section 62c. The barriers 72 act as inflation fluid guiding walls in the first layer 66c of the diffuser section 62c to direct inflation fluid toward the plurality of openings 38c in the first fabric panel 30c.

Figure 10:
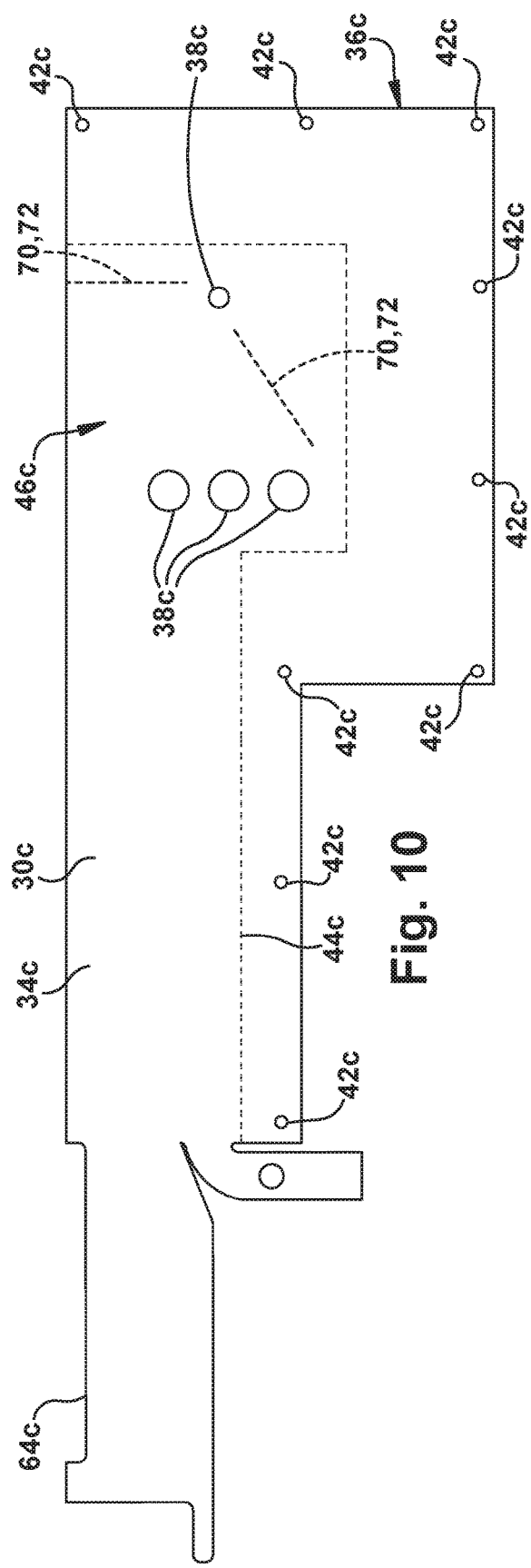
FIG. 10 is a side view of a portion of the element of FIG. 8.

Although the barriers 72 of the example configuration of FIGS. 9-10 are formed in the first layer 66c of the diffuser section 62c, the barriers can instead, or additionally, be formed in the second layer 68c of the diffuser section. In this configuration, one or more secondary seams 70 can extend through at least the second layer 68c of the diffuser section 62c and form one or more barriers 72 in the diffuser section between the overlying first and second portions 52c, 54c of the second fabric panel 48c, between the first portions 34c, 52c of the first and second fabric panels 30c, 48c, and/or between the second portions 36c, 54c of the first and second fabric panels.

Figure 11:
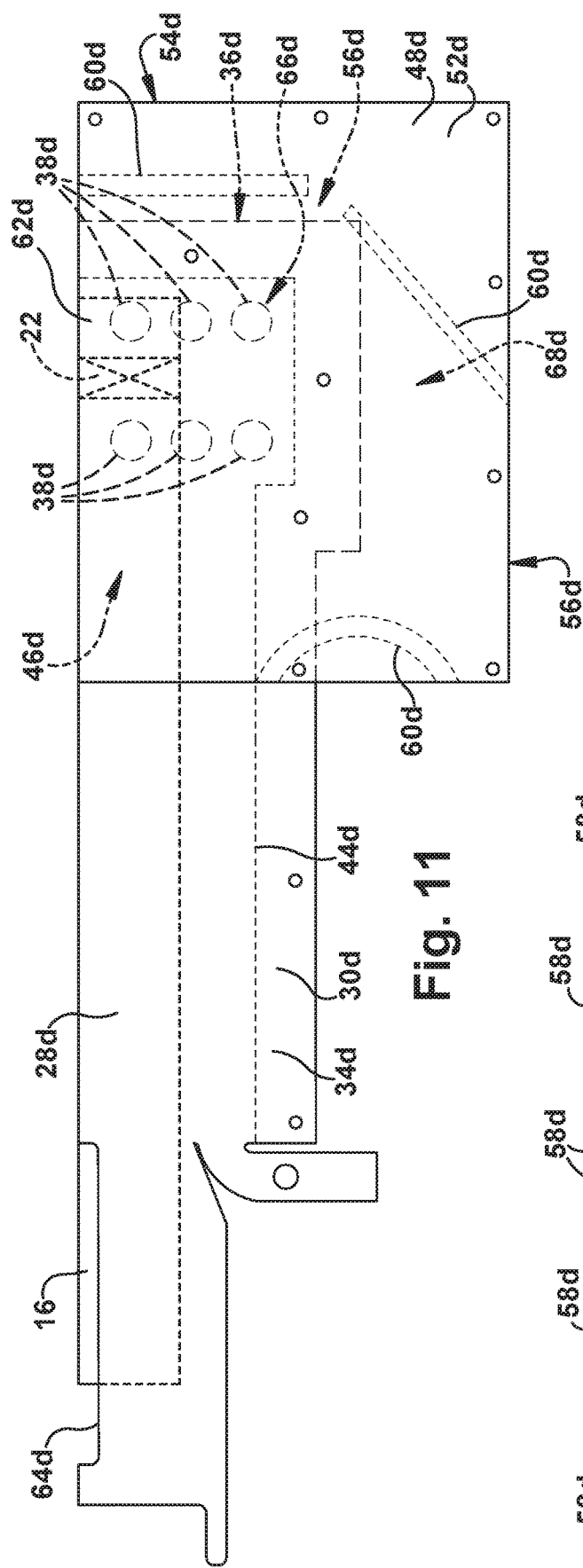
FIG. 11 is a schematic side view of an element of the apparatus of FIG. 1 in a fifth configuration.
Figure 12:
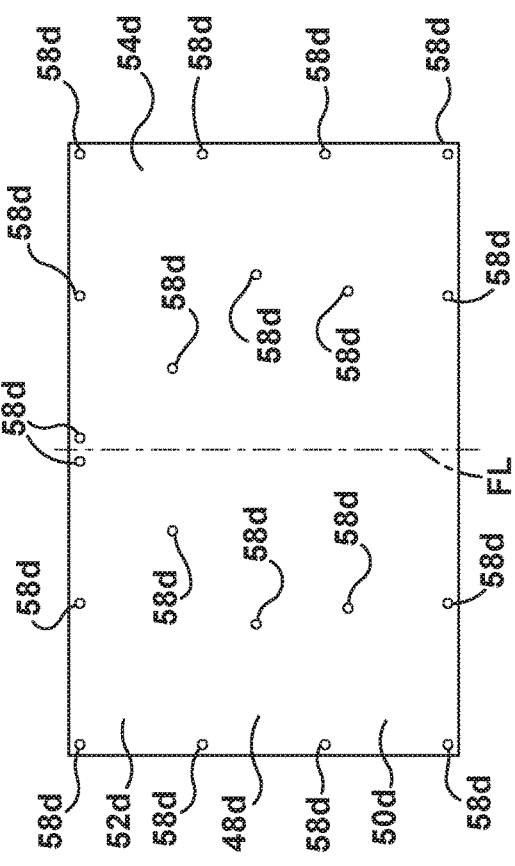
FIG. 12 is a side view of a portion of the element of FIG. 10.

The example configuration of the fabric diffuser 28d shown in FIG. 11 is substantially similar to the fabric diffuser 28 shown in FIGS. 1-5, except that the plurality of openings 38d formed in the first fabric panel 30d of the fabric diffuser 28d of FIG. 11 have a circular configuration instead of a square configuration. Further, as shown in FIG. 12, the second fabric panel 48d of the fabric diffuser 28d does not have a plurality of openings that permit the passage of inflation fluid formed therein. Instead, as shown in FIG. 11, the plurality of openings 56d of the second fabric panel 48d are defined by the second fabric panel. The first and second portions 52d, 54d of the second fabric panel 48d are interconnected to each other and to the first fabric panel 30d along a plurality of seams 60d. The seams 60d, together with the overlying first and second portions 52d, 54d of the second fabric panel 48d, define the plurality of openings 56d of the second fabric panel. The plurality of openings 56d of the second fabric panel 48d thus extend between the overlying first and second portions 52d, 54d of the second fabric panel perpendicular to the plurality of openings 38d in the first fabric panel 30d.

Although the plurality of openings 38d in the first fabric panel 30d are formed in the first fabric panel while the plurality of openings 56d in the second fabric panel 48d are defined by the second fabric panel, the plurality of openings in the first fabric panel can be defined by the first fabric panel formed while the plurality of openings in the second fabric panel are formed in the second fabric panel. In this configuration, one or more seams 44d in which the first and second portions 34d, 36d of the first fabric panel 30d are interconnected along, together with the overlying first and second portions of the first fabric panel, define the plurality of openings 38d of the first fabric panel. The plurality of openings 38d of the first fabric panel thus would extend between the overlying first and second portions 34d, 36d of the first fabric panel perpendicular to the plurality of openings 56d formed in the second fabric panel 48d.

Although the fabric diffusers 28, 28a, 28b, 28c, 28d have been described and depicted herein as being configured to be installed and utilized in the curtain airbag 12, the fabric diffusers can also or instead be configured to be installed and utilized in any other type of airbag, such as in, for example, a driver frontal airbag, a passenger frontal airbag, a center side airbag, a side airbag, a torso airbag, a knee airbag, a rear window airbag, or a pedestrian airbag. Regardless of how each fabric diffuser 28, 28a, 28b, 28c, 28d is applied to a particular type of airbag, each fabric diffuser will be configured to provide an indirect path for inflation fluid to travel from inside the diffuser section 62, 62a, 62b, 62c, 62d to the exterior of the fabric diffuser.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, comprising:
   an airbag;
   an inflator for inflating the airbag; and
   a fabric diffuser for directing inflation fluid from the inflator into the airbag, the fabric diffuser comprising first and second fabric panels arranged overlying each other and having portions interconnected along seams to define a pocket configured to receive the inflator, the pocket having a double layer diffuser section defined by the overlying first and second fabric panels;
   wherein the fabric diffuser and the inflator are configured to be installed in the airbag;
   wherein the diffuser section comprises a plurality of openings formed in and/or defined by the first and second fabric panels, the openings providing fluid communication from inside the diffuser section to the exterior of the fabric diffuser;

wherein the fabric diffuser has an inflator receiving section with an inflator receiving opening through which the inflator can be inserted into the fabric diffuser, and a longitudinally extending intermediate section longitudinally separating the inflator receiving section from the diffuser section, the inflator extending longitudinally through the intermediate section and into the diffuser section so that a discharge end of the inflator is positioned in the diffuser section adjacent the openings; and wherein the first and second fabric panels are configured so that the openings of the first fabric panel do not overlie the openings of the second fabric panel when the panels are interconnected so that inflation fluid travels an indirect path from inside the diffuser section to the exterior of the fabric diffuser.

2. The apparatus recited in claim 1, wherein the inflation fluid travelling the indirect path travels from inside the diffuser section through the openings of the first fabric panel, between the first and second fabric panels, and then through the openings of the second fabric panel to the exterior of the fabric diffuser.

3. The apparatus recited in claim 1, wherein the inflation fluid travelling the indirect path travels from inside the diffuser section through the openings of the first fabric panel, is redirected by the second fabric panel, and then travels through the openings of the second fabric panel to the exterior of the fabric diffuser.

4. The apparatus recited in claim 1, wherein the first fabric panel is folded about a fold-line to define overlying layers of the first fabric panel, the overlying layers being interconnected along seams and defining the inflator receiving section as a single layer portion of the fabric diffuser.

5. The apparatus recited in claim 4, wherein the seams comprise at least one edge seam that extends about a perimeter of the pocket to define the pocket, and at least one interior seam that is spaced from the perimeter of the pocket and extends through an interior of the diffuser section to form a barrier in the diffuser section between the overlying layers of the first fabric panel for directing inflation fluid toward the openings of the first fabric panel.

6. The apparatus recited in claim 4, wherein the second fabric panel is separate from the first fabric panel and is wrapped around and connected to the folded and interconnected first fabric panel to define the diffuser section.

7. The apparatus recited in claim 6, wherein a space through which inflation fluid is configured to travel is defined between the first and second fabric panels.

8. The apparatus recited in claim 6, wherein the diffuser section comprises a plurality of openings formed in the first and second fabric panels.

9. The apparatus recited in claim 6, wherein the openings of the first fabric panel extend through fabric forming the first fabric panel, the openings of the second fabric panel being defined by overlying layers of the second fabric panel and by a portion of the seams that interconnects the overlying layers of the second fabric panel to each other so that the plurality of openings of the second fabric panel extend between the overlying layers of the second fabric panel perpendicular to the openings of the first fabric panel.

10. The apparatus recited in claim 1, wherein the openings of the first and second fabric panels define a plurality of fluid paths extending from inside the diffuser section to the exterior of the fabric diffuser, at least one of the fluid paths being configured to direct inflation fluid into the airbag in a different direction than at least one other of the fluid paths.

11. The apparatus recited in claim 1, wherein at least one of the plurality of openings is configured to permit a greater flow rate of inflation fluid therethrough than at least one other of the plurality of openings.

12. The apparatus recited in claim 1, wherein the openings of the first fabric panel extend through fabric forming the first fabric panel, the openings of the second fabric panel extending through fabric forming the second fabric panel.

13. The apparatus recited in claim 1, wherein the openings of the first fabric panel extend through fabric forming the first fabric panel, the openings of the second fabric panel being defined by overlying layers of the second fabric panel so that the openings of the second fabric panel extend between overlying layers of the second fabric panel perpendicular to the openings of the first fabric panel.

14. The apparatus recited in claim 1, wherein the airbag is a curtain airbag and the fabric diffuser is configured to be installed in a mouth opening of the curtain airbag.

15. A method for constructing the apparatus of claim 1, the method comprising:
inserting an inflator into the pocket of the fabric diffuser;
arranging the inflator in the pocket so that the discharge end of the inflator is received in the diffuser section; and
inserting the combined fabric diffuser and inflator into the airbag.

16. The method recited in claim 15, wherein the airbag is a curtain airbag, and wherein inserting the combined fabric diffuser and inflator into the airbag comprises inserting the combined fabric diffuser and inflator into a mouth opening of the curtain airbag.

17. A vehicle safety system comprising:
the apparatus recited in claim 1; and
an airbag controller operatively connected to the inflator and configured to actuate the inflator in response to sensing the occurrence of an event for which occupant protection is desired.

18. The apparatus recited in claim 1, wherein an entire longitudinal length of the inflator is inserted into the fabric diffuser.

19. The apparatus recited in claim 1, wherein upon activation of the inflator, the inflator expels inflation fluid directly into the diffuser section adjacent the openings.

20. The apparatus recited in claim 1, wherein the inflator receiving section and a portion of the intermediate section are single layer sections defined by only the first fabric panel, the second fabric panel being longitudinally spaced from the single layer sections of the fabric diffuser.

21. The apparatus recited in claim 1, wherein the inflator receiving section and a portion of the intermediate section are single layer sections defined by the first fabric panel, and wherein the diffuser section comprises a double layer section in which the first and second fabric panels overlie each other.

22. The apparatus recited in claim 1, wherein a portion of at least one of the openings of the second fabric panel does not overlie the first fabric panel.

23. An apparatus for helping to protect an occupant of a vehicle, comprising:
a curtain airbag configured to inflate away from a roof of the vehicle adjacent a side structure of the vehicle, the curtain airbag comprising an inflatable volume and a neck portion that provides fluid communication between the inflatable volume and an exterior of the curtain airbag;
an inflator for inflating the curtain airbag; and a fabric diffuser for directing inflation fluid from the inflator into the curtain airbag, the diffuser comprising first and second fabric panels arranged overlying each other and having portions interconnected along seams, wherein the diffuser comprises a diffuser section and an inflator receiving section;

wherein the diffuser is configured to be installed through the neck portion of the curtain airbag so that the diffuser section is positioned in the inflatable volume of the curtain airbag and the inflator receiving section is positioned in the neck portion of the curtain airbag;

wherein the inflator is configured to be installed through the inflator receiving section of the diffuser such that a discharge end of the inflator is positioned in the diffuser section, and an inflator body extends from the discharge end through both the inflator receiving section of the diffuser and the neck portion of the curtain airbag;

wherein the diffuser section comprises a plurality of openings formed in and/or defined by the first and second fabric panels, the openings providing fluid communication from inside the diffuser section to the exterior of the diffuser, wherein the first and second fabric panels are configured so that the openings of the first fabric panel do not overlie the openings of the second fabric panel when the panels are interconnected so that inflation fluid travels an indirect path from inside the diffuser section to the exterior of the diffuser.

24. A fabric diffuser for directing inflation fluid from an inflator into an airbag, the fabric diffuser comprising:

a first fabric panel that is folded over onto itself and has overlying portions interconnected along a first seam to form a longitudinally extending tube with an open end and a closed end, wherein a portion of the tube extending longitudinally from the open end defines inflator receiving section of the diffuser, and wherein a portion of the tube extending longitudinally from the inflator receiving section and including the closed end of the tube defines an inner diffuser panel, the inner diffuser panel including a plurality of diffuser openings; and a second fabric panel that is folded around the inner diffuser panel and defines an outer diffuser panel that envelopes the inner diffuser panel, the outer diffuser panel comprising overlying peripheral portions that extend beyond the inner diffuser panel and include a plurality of diffuser openings, wherein the overlying peripheral portions of the outer diffuser panel are interconnected along a second seam;

wherein the first and second diffuser panels define a diffuser section of the fabric diffuser, with the diffuser openings providing fluid communication from inside the diffuser section to the exterior of the fabric diffuser, wherein the diffuser openings of the first diffuser panel do not overlie the openings of the second diffuser panel so that inflation fluid travels an indirect path from inside the diffuser section to the exterior of the fabric diffuser.

25. The apparatus recited in claim 24, wherein the overlying peripheral portions of the outer diffuser panel that include the diffuser openings extend longitudinally and/or vertically beyond the inner diffuser panel, wherein the vertical direction is perpendicular to the longitudinal direction.

26. The fabric diffuser recited in claim 24, wherein at least a portion of the diffuser openings of the outer diffuser panel are positioned between the first seam and the second seam.

27. The fabric diffuser recited in claim 24, wherein portions of the second seam that directly interconnect the overlying peripheral portions of the second diffuser panel are free from interconnections with the first diffuser panel.

\* \* \* \* \*